(12) United States Patent
Deguchi et al.

(10) Patent No.: US 8,073,408 B2
(45) Date of Patent: Dec. 6, 2011

(54) SEMICONDUCTOR INTEGRATED CIRCUIT INCLUDING A MIXER AND WIRELESS COMMUNICATION APPARATUS

(75) Inventors: Jun Deguchi, Kanagawa-ken (JP); Daisuke Miyashita, Kanagawa-ken (JP); Hideyuki Kokatsu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 12/489,860

(22) Filed: Jun. 23, 2009

(65) Prior Publication Data

US 2009/0318096 A1    Dec. 24, 2009

(30) Foreign Application Priority Data

Jun. 23, 2008   (JP) .................. 2008-163383

(51) Int. Cl.
*H04B 1/04*   (2006.01)
*H04K 3/00*   (2006.01)

(52) U.S. Cl. ............ 455/114.1; 332/107; 332/160; 375/296

(58) Field of Classification Search ........... 455/114.1, 455/114.2; 332/107, 123–124, 159–160; 375/296–298
See application file for complete search history.

(56) References Cited

U.S. PATENT DOCUMENTS 5,041,793 A * 8/1991 Gailus .................. 330/2

FOREIGN PATENT DOCUMENTS

| JP | 63-175507 | 7/1988 |
|----|-----------|--------|
| JP | 2003-69344 | 3/2003 |
| JP | 2003-163601 | 6/2003 |
| JP | 2006-295828 | 10/2006 |

OTHER PUBLICATIONS

Japanese Office Action issued Feb. 15, 2011, in Patent Application No. 2008-163383 (with English-language translation).
A. Mirzaei et al., "A Low-Power WCDMA Transmitter with an Integrated Notch Filter", Digest of Technical Papers, ISSCC 2008/ Session 10/ Cellular Transceivers/ 10.7, pp. 212-213 and continuation p. 608.

* cited by examiner

*Primary Examiner* — Lee Nguyen
(74) *Attorney, Agent, or Firm* — Oblon, Spivak, McClelland, Maier & Neustadt, L.L.P.

(57) ABSTRACT

A semiconductor integrated circuit includes a first input terminal configured to input a baseband signal, a second input terminal configured to input a local oscillation signal, an output terminal configured to output a modulating signal, a first amplifier circuit configured to receive the baseband signal through the first input terminal and to output a first amplified signal of the baseband signal, a 2-multiplying circuit configured to receive the local oscillation signal through the second input terminal and to output a 2-multiplied signal of the local oscillation signal, an adder configured to add the 2-multiplied signal and the first amplified signal and to output an addition signal, a second amplifier circuit configured to receive the addition signal and to output a second amplified signal of the addition signal, and a mixer configured to multiply the second amplified signal and the local oscillation signal and to output the modulating signal to the output terminal.

20 Claims, 9 Drawing Sheets

SEMICONDUCTOR INTEGRATED CIRCUIT INCLUDING A MIXER AND WIRELESS COMMUNICATION APPARATUS

CROSS-REFERENCE TO RELATED APPLICATIONS

This application is based upon and claims the benefit of priority from the prior Japanese Patent Application No. 2008-163383, filed Jun. 23, 2008, the entire contents of which are incorporated herein by reference.

BACKGROUND OF THE INVENTION

1. Field of the Invention

The present invention relates to a semiconductor integrated circuit including a mixer, and a wireless communication apparatus including the semiconductor integrated circuit.

2. Description of the Related Art

In a GSM (Global System For Mobile Communications) transmitter or a WCDMA (Wideband Code Division Multiple Access) transmitter, specifications of receiving band noise of a low level must be satisfied, and a transmitting spectrum must be in a regulation spectrum mask by satisfying low distortion requirements.

Generally, a transmitter is designed so that a transmitting spectrum is in a regulation spectrum mask. Furthermore, a receiving band noise level is decreased by inserting a SAW (Surface Acoustic Wave) filter etc. in a transmitter output.

However, in a transmitter, it will be mainstream in the future to reduce chip external devices, especially SAW filters, so as to reduce an implementation area and costs for the purpose of enhancement of competitiveness.

The specification of receiving band noise of a low level will still be applied in the future, while also desiring to reduce an implementation area. Actually, in a conference presentation, a WCDMA transmitter aiming at reducing SAW filters has been reported.

To reduce the receiving band noise of a transmitter, it is known to raise the gain of a transmitter. However, generating spurious signals in a transmitter increases when a gain is raised. A transmitting spectrum may not then fall in a regulation spectrum mask. That is, noise and distortion have the relation of a trade-off, and it is difficult to realize both of low noise and low distortion simultaneously.

BRIEF SUMMARY OF THE INVENTION

According to one exemplary aspect of an embodiment of the present invention, a semiconductor integrated circuit includes a first input terminal inputting a baseband signal, a second input terminal inputting a local oscillation signal, an output terminal outputting a modulating signal, a first amplifier circuit receiving the baseband signal through the first input terminal and outputting a first amplified signal of the baseband signal, a 2-multiplying circuit receiving the local oscillation signal through the second input terminal and outputting a 2-multiplying signal of the local oscillation signal, an adder adding the 2-multiplied signal and the first amplified signal and outputting an addition signal, a second amplifier circuit receiving the addition signal and outputting a second amplified signal of the addition signal, and a mixer multiplying the second amplified signal and the local oscillation signal and outputting the modulating signal to the output terminal.

According to another exemplary aspect of an embodiment of the present invention, a wireless communication apparatus includes a wireless transmitter including a wireless transmitting antenna, a wireless receiver including a wireless receiving antenna, wherein the wireless transmitter includes a first input terminal inputting a baseband signal, a second input terminal inputting a local oscillation signal, an output terminal outputting a modulating signal, a first amplifier circuit receiving the baseband signal through the first input terminal and outputting a first amplified signal of the baseband signal, a 2-multiplying circuit receiving the local oscillation signal through the second input terminal and outputting a 2-multiplied signal of the local oscillation signal, an adder adding the 2-multiplied signal and the first amplified signal and outputting an addition signal, a second amplifier circuit receiving the addition signal and outputting a second amplified signal of the addition signal, and a mixer multiplying the second amplified signal and the local oscillation signal and outputting the modulating signal to the output terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Various other objects, features and attendant advantages of the present invention will be more fully appreciated from the following detailed description when considered in connection with the accompanying drawings in which like reference characters designate like or corresponding parts throughout the several views.

COMPARATIVE EXAMPLE

In a wireless transmitter, generating unnecessary spurious signals is a problem attributed to distortion generated in a quadrature modulator (mixer circuit).

Figure 1:
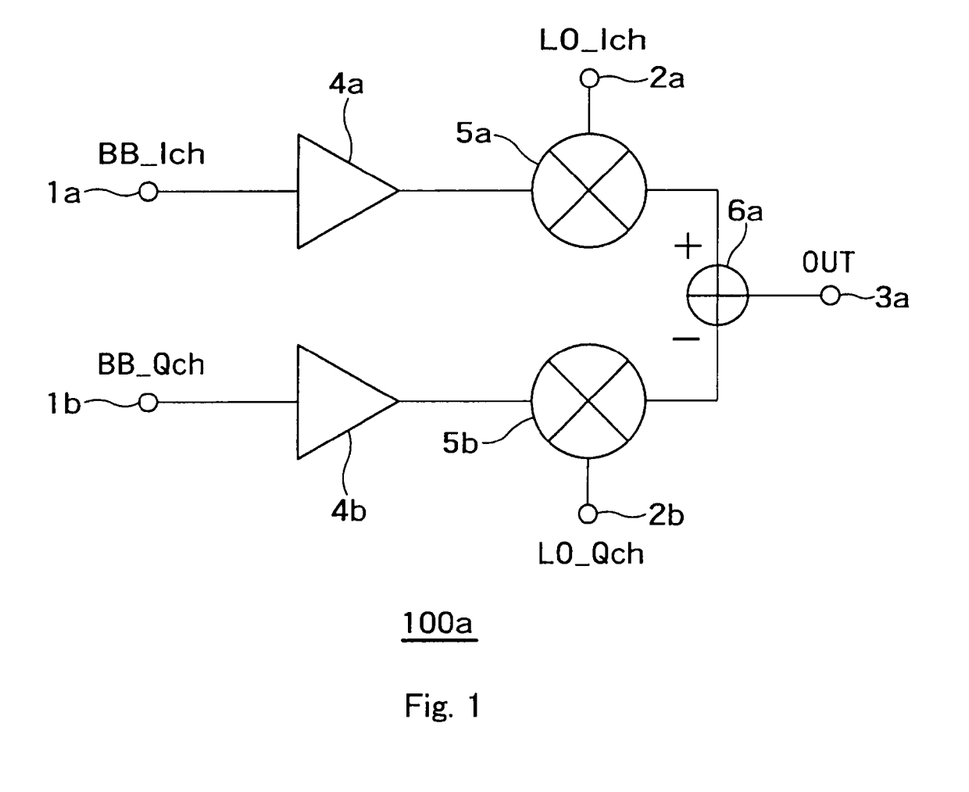
FIG. 1 is a block diagram of a comparative example of a quadrature modulator.

As shown in FIG. 1, a quadrature modulator 100a includes input terminal 1a inputting BB (Base Band: baseband) signal BB_Ich (in-phase component), input terminal 1b inputting BB_Qch (quadrature component), input terminal 2a inputting LO (Local Oscillation) signal LO_Ich (in-phase component), input terminal 2b inputting LO_Qch (quadrature component), and output terminal 3a outputting a modulating signal.

Quadrature modulator 100a includes an amplifier circuit 4a to which baseband-signal BB_Ich is input through input terminal 1a and that outputs an amplified baseband-signal BB_Ich, and an amplifier circuit 4b to which baseband-signal BB_Qch is input through input terminal 1b and that outputs an amplified baseband-signal BB_Qch.

Quadrature modulator 100a includes mixer 5a that multiplies the output signal of amplifier circuit 4a and the local oscillation signal input through terminal 2a, mixer 5b that multiplies the output signal of amplifier circuit 4b and the local oscillation signal input through terminal 2b, and adder 6a that adds the signal output by amplifier circuit 4a and the signal output by amplifier circuit 4b.

Figure 2:
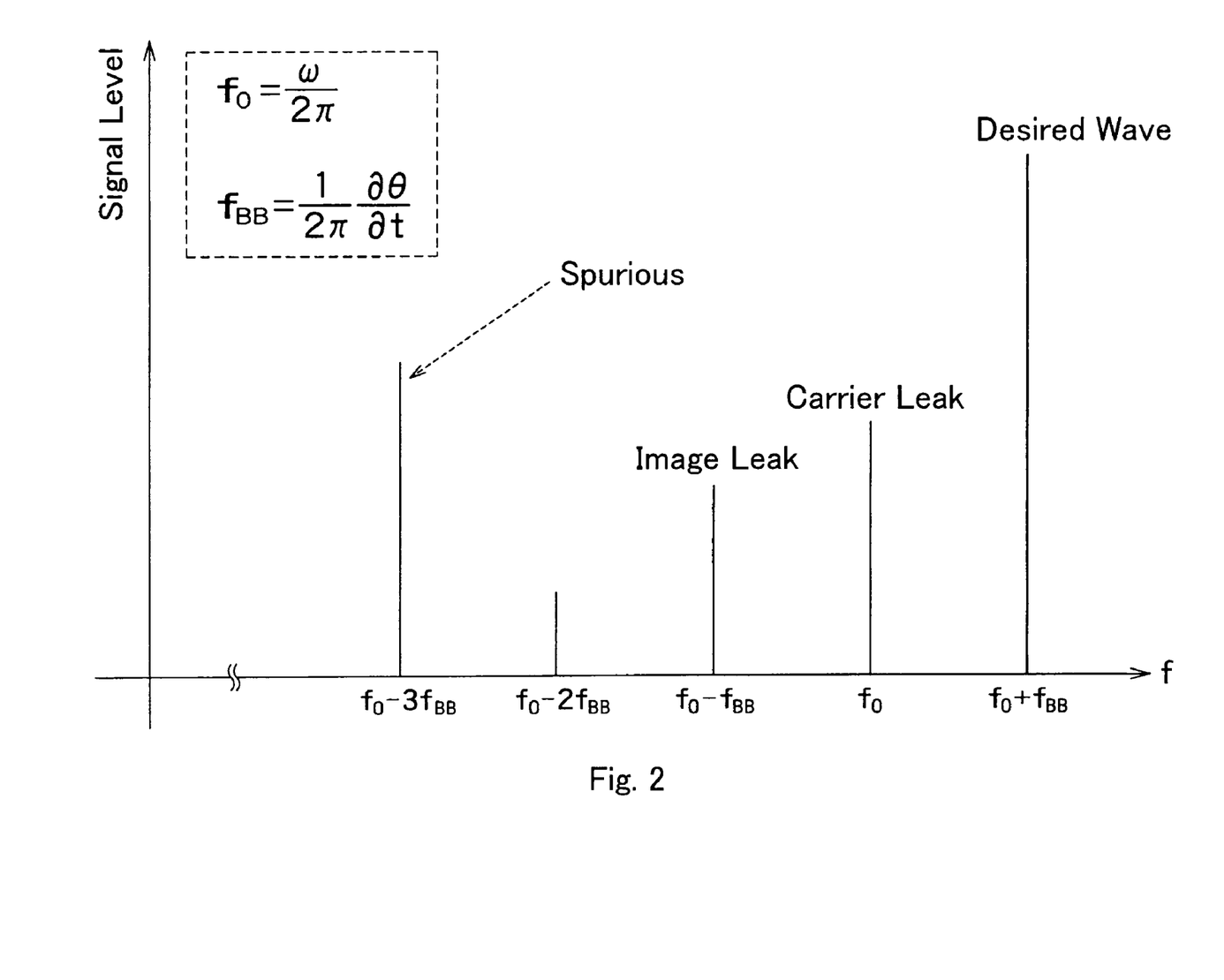
FIG. 2 is an example of the signal output from the quadrature modulator 100a shown in FIG. 1.

Hereafter, as shown in FIG. 2, the frequency of the BB signal is $f_{BB}$, and the frequency of the LO signal is $f_0$.

In FIG. 2, the signal of frequency $f_0+f_{BB}$ is a desired wave, the signal of frequency $f_0$ is a carrier leak, and the signal of frequency $f_0-f_{BB}$ is an image leak. The signal of frequency $f_0-2f_{BB}$ is a spurious signal that up-converts the component generated by second distortion of baseband amplifier by the LO signal. The signal of frequency $f_0-3f_{BB}$ is a spurious signal that up-converts the component generated by third distortion of baseband amplifier by the LO signal.

Here, conventionally, methods of decreasing carrier leak and image leak have been proposed, and carrier leak and image leak do not often cause a problem. Spurious signal of frequency $f_0-2f_{BB}$ is very small if the second distortion of baseband amplifier is good (differential structure). For this reason, a spurious signal of frequency $f_0-2f_{BB}$ also does not often cause a problem.

However, a spurious signal of frequency $f_0-3f_{BB}$ is attributed to the 3rd distortion of the baseband amplifier, and has the relation of trade-off between the above-mentioned noise and distortion. For this reason, it is not easy to decrease the spurious signal of frequency $f_0-3f_{BB}$.

Then, to avoid the relation of a trade-off between the above-mentioned noise and distortion, a distortion cancellation/reduction technique is proposed in a mixer circuit (quadrature modulator).

Below, to simplify, an argument is advanced not to a quadrature modulator having Ich-Qch (an in-phase component and quadrature component) but to the mixer having either of Ich or Qch.

Figure 3:
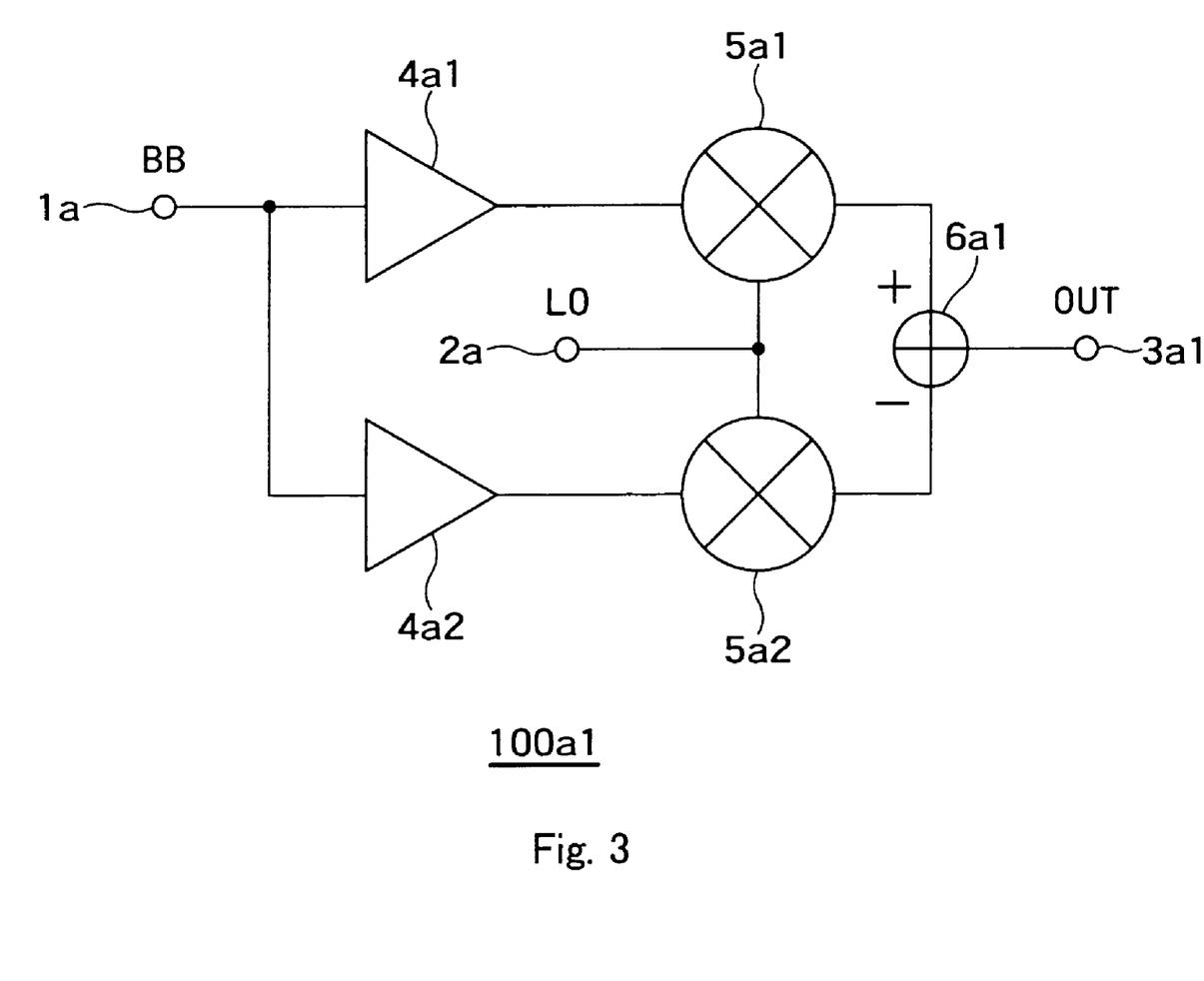
FIG. 3 is a comparative example of a mixer circuit.

As shown in FIG. 3, mixer circuit 100a1 includes input terminals 1a and 2a, output terminal 3a1, main-amplifier circuit 4a1, sub-amplifier circuit 4a2, main mixer 5a1, sub-mixer 5a2, and adder 6a1.

Mixer circuit 100a1 includes a path of a main amplifier and main mixer, which is a path of a general mixer circuit as shown in FIG. 1, and a path of a sub-amplifier and sub-mixer for canceling distortion.

Here, the gain of sub-amplifier circuit 4a2 is smaller than that of main-amplifier circuit 4a1. However, it is important for the level of the 3rd distortion generated in sub-amplifier circuit 4a2 to be equivalent to the level of the third distortion generated in main-amplifier circuit 4a1.

That is, a spurious signal of frequency $f_0-3f_{BB}$ attributed to the 3rd distortion generated in sub-amplifier circuit 4a2 and a spurious signal of frequency $f_0-3f_{BB}$ attributed to the 3rd distortion generated in main-amplifier circuit 4a1 have opposite phases and are added. A spurious signal of frequency $f_0-3f_{BB}$ finally output from mixer circuit 100a1 can thereby be canceled or reduced.

However, in the case of mixer circuit 100a1 shown in FIG. 3, a desired wave component is also added simultaneously.

For this reason, the level of a desired wave also changes by the amount of the desired wave level generated in a path of the sub-amplifier and sub-mixer.

Furthermore, since sub-amplifier circuit 4a2 is used, noise characteristics also deteriorate. That is, the relation of a trade-off between noise and distortion still exists. Thus, it is difficult to realize both of low noise and low distortion simultaneously also by the above-mentioned comparative example of FIGS. 1-3.

So, in embodiments for this invention, a new technique for canceling a spurious signal of frequency $f_0-3f_{BB}$ is proposed.

Figure 4:
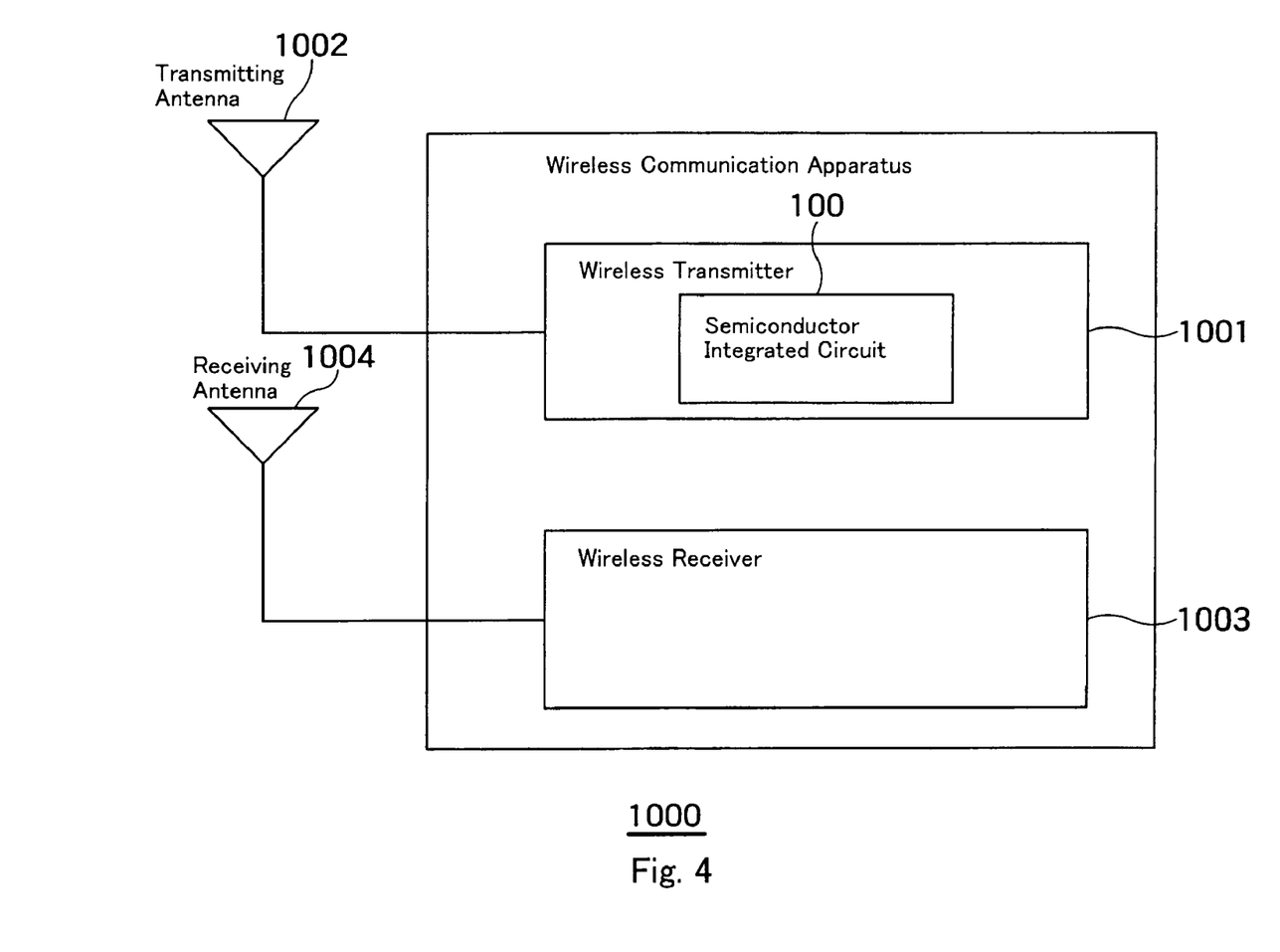
FIG. 4 is a block diagram of a wireless communication apparatus 1000 of a first embodiment of the present invention.

As shown in FIG. 4, in a first embodiment of the present invention a wireless communication apparatus 1000 includes a wireless transmitter 1001 and wireless receiver 1003. Wireless communication apparatus 1000 can be a cellular phone, PDA (Personal Data Assistant), etc.

Wireless receiver 1003 receives a signal by receiving antenna 1004. After processing the signal, the signal is output to an internal circuitry (not shown).

Wireless transmitter 1001 includes a semiconductor integrated circuit 100 that mixes a BB (baseband) signal and a LO (local oscillation) signal according to the signal output from this internal circuitry, and outputs a modulating signal (desired wave). The signal according to this modulating signal is transmitted from transmitting antenna 1002.

Figure 5:
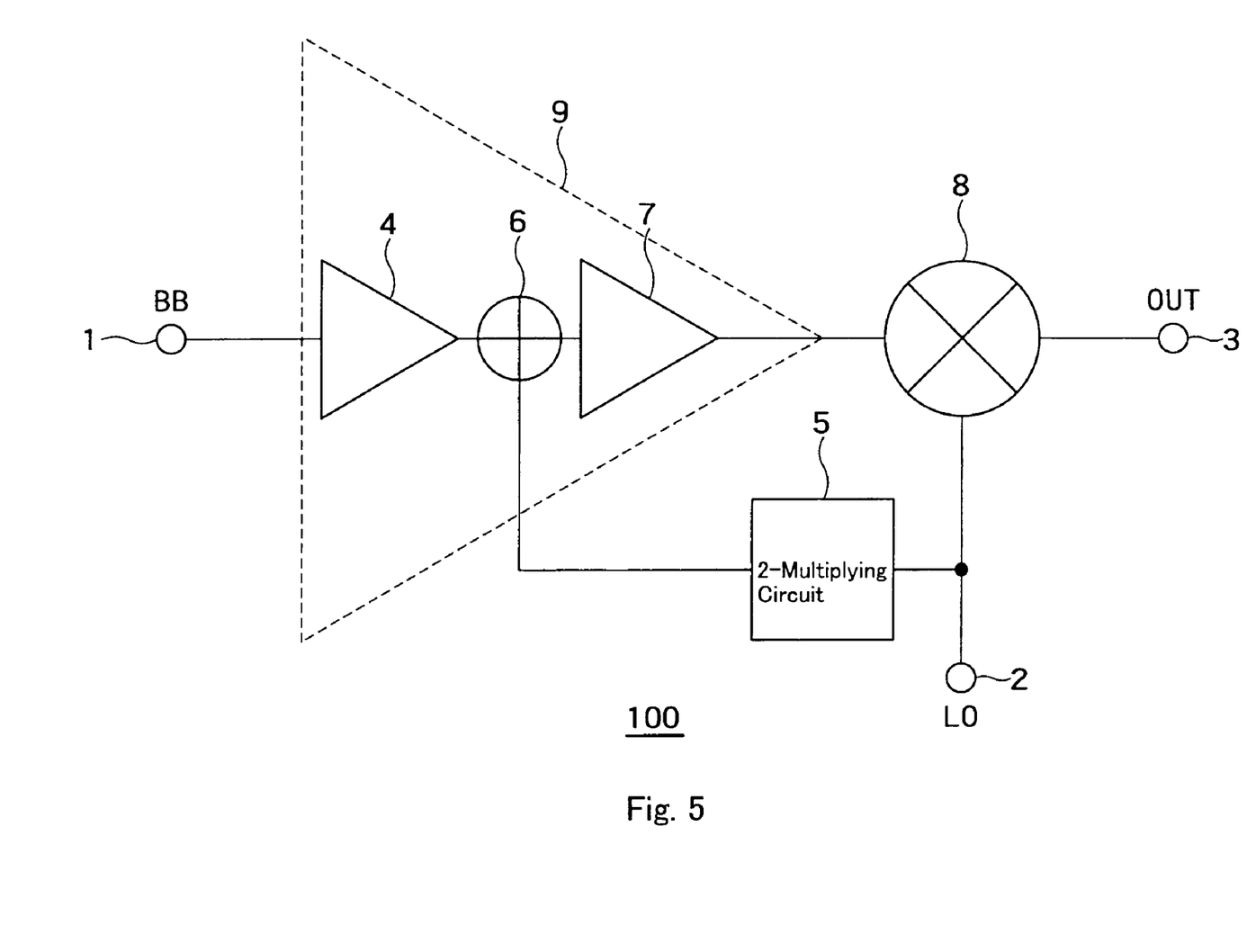
FIG. 5 is a block diagram of semiconductor integrated circuit 100 shown in FIG. 4.

As shown in FIG. 5, semiconductor integrated circuit 100 includes 1st input terminal 1, 2nd input terminal 2, output terminal 3, 1st amplifier circuit 4, 2-multiplying circuit 5, adder 6, 2nd amplifier circuit 7, and mixer 8.

In addition, amplifier apparatus 9 includes the 1st amplifier circuit 4, adder 6, and 2nd amplifier circuit 7.

1st input terminal 1 inputs a BB (baseband) signal. 2nd input terminal 2 inputs a LO (local oscillation) signal. Output terminal 3 outputs a modulating signal.

1st amplifier circuit 4 receives the baseband (BB) signal through 1st input terminal 1, and outputs the amplified input baseband (BB) signal.

2-multiplying circuit 5 receives a local oscillation (LO) signal through 2nd input terminal 2, and outputs a 2-multiplied signal of the input local oscillation (LO) signal. In addition, in this embodiment, the signal level is amplified A-fold by the 2-multiplying circuit 5.

Adder 6 adds the 2-multiplied signal and the signal output by 1st amplifier circuit 4, and outputs the acquired addition signal.

2nd amplifier circuit 7 receives the addition signal from adder 6 and outputs the amplified received addition signal.

Mixer 8 multiplies the signal output by 2nd amplifier circuit 7 and the local oscillation (LO) signal input through 2nd input terminal 2, and outputs the mixed output signal as a modulating signal to output terminal 3.

As mentioned above, cancellation of a spurious signal of frequency $f_0-3f_{BB}$ can be realized by semiconductor integrated circuit 100 as discussed further below.

For this reason, semiconductor integrated circuit 100 of this first embodiment has the characteristics that a signal level changes as in the mixer circuit of the comparative example shown in FIG. 3, but noise characteristics do not deteriorate.

Below, to show these characteristics, as an example, an amplifier (even the 3rd distortion is taken into consideration) and an input signal are formulized, and an explanation is advanced.

The function Amp1(x) of the 1st amplifier circuit 4 is approximated as in equation (1), assuming that second distortion is not generated in 1st amplifier circuit 4. In addition, in equation (1), $\alpha_3$ is a real number.

$$Amp1(x) = x + \alpha_3 x^3 \qquad (1)$$

The function Amp2(x) of the 2nd amplifier circuit 7 is approximated as in equation (2), assuming second distortion does not occur in 2nd amplifier circuit 7. In addition, in equation (2), $\beta_3$ is a real number.

$$Amp2(x) = x + \beta_3 x^3 \qquad (2)$$

BB signal BB(t) is expressed as in equation (3).

$$BB(t) = \cos(\theta(t)) \qquad (3)$$

LO signal LO(t) is expressed as in equation (4). In addition, in equation (4), $\omega_0$ is the angular velocity of LO signal LO(t).

$$LO(t) = \sin(\omega_0 t) \qquad (4)$$

Therefore, multiplying signal LO2(t) of 2-multiplying circuit 5 is expressed as in equation (5). In addition, in equation (5), A is the gain of the 2-multiplying circuit 5 in the first embodiment. Gain A is a real number.

$$LO2(t) = -A\cos(2\omega_0 t) \qquad (5)$$

In addition, the transfer function of Amp1(x)+Amp2(x) is assumed to be equivalent to the transfer function of the amplifier of the usual mixer circuit as shown in FIG. 1, and second distortion is not generated supposing a differential circuit configuration.

At this time, the output Out(t) of mixer 8 is expressed as in equation (6).

$$Out(t) = LO(t) \times Amp2(Amp1(BB(t)) + LO2(t)) \qquad (6)$$

Here, equations (1) to (5) are assigned to equation (6). Desired wave ($f_0+f_{BB}$) component C1 and frequency ($f_0-3f_{BB}$) component C2 are extracted. Desired wave ($f_0+f_{BB}$) component C1 is expressed as in equation (7) and frequency ($f_0-3f_{BB}$) component C2 is expressed as in equation (8).

$$C1 = \frac{1}{2} + \frac{3\alpha_3}{8} + \frac{3\beta_3}{8} + \frac{15\alpha_3\beta_3}{16} + \frac{105\alpha_3^2\beta_3}{128} + \frac{63\alpha_3^3\beta_3}{256} + \frac{3\beta_3 A^2}{4} + \frac{9\alpha_3\beta_3 A^2}{16} \qquad (7)$$

$$C2 = \frac{\alpha_3}{8} + \frac{\beta_3}{8} + \frac{15\alpha_3\beta_3}{32} + \frac{63\alpha_3^2\beta_3}{128} + \frac{21\alpha_3^3\beta_3}{128} + \frac{3\alpha_3\beta_3 A^2}{16} \qquad (8)$$

And when frequency $f_0-3f_{BB}$ component C2=0, $A^2$ is expressed as in equation (9). That is, when the conditions of equation (9) are satisfied, it results that spurious signal cancellation of frequency $f_0-3f_{BB}$ is possible.

$$A^2 = -\frac{2}{3}\left(\frac{1}{\alpha_3} + \frac{1}{\beta_3}\right) - \frac{7\alpha_3}{8}(\alpha_3 + 3) - \frac{5}{2} \qquad (9)$$

However, $\alpha_3$ and $\beta_3$ need to be set up so that the conditions of $A^2>0$ may be satisfied, since gain A is a real number. When satisfying this condition, equation (9) is assigned to equation (7) and desired wave component C1 is expressed as in equation (10).

$$C1 = -\frac{\beta_3}{2\alpha_3} - \frac{15\beta_3}{8} - \frac{39\alpha_3\beta_3}{16} - \frac{21\alpha_3^2\beta_3}{16} - \frac{63\alpha_3^3\beta_3}{256} \qquad (10)$$

Here, as an example, a numerical value is assigned to $\alpha_3$ and $\beta_3$.

For example, in the case of $\alpha_3=-0.02$ and $\beta_3=-0.02$, desired wave ($f_0+f_{BB}$) component C1 and frequency $f_0-3f_{BB}$ component C2 are as follows when not canceling a spurious signal of frequency $f_0-3f_{BB}$ (gain A=0).

Desired wave ($f_0+f_{BB}$) component C1 (with no cancellation): −6.28 [dB]

Frequency ($f_0-3f_{BB}$) component C2 (with no cancellation): −40.07 [dBc]

On the other hand, to cancel a spurious signal of frequency ($f_0-3f_{BB}$), the components C1, C2 are as follows in the case of gain A=8.12.

Desired wave ($f_0+f_{BB}$) component C1 (with cancellation): −6.22 [dB]

Frequency ($f_0-3f_{BB}$) component (with cancellation): −71.59 [dBc]

Therefore, in semiconductor integrated circuit 100 of the first embodiment, a spurious signal of frequency ($f_0-3f_{BB}$) can be reduced by about 30 dB by setting up gain A of 2-multiplying circuit 5 as mentioned above, without affecting desired wave ($f_0+f_{BB}$) component C1.

Moreover, since semiconductor integrated circuit 100 does not include a SAW filter, circuit area can be reduced.

As mentioned above, the semiconductor integrated circuit of the first embodiment can reduce a spurious signal, and have a reduced circuit area.

In a second embodiment of the present invention, an example of a configuration for adjusting gain A is described in a semiconductor integrated circuit. In addition, as shown in FIG. 6, semiconductor integrated circuit 200 is applied to wireless transmitter 1001 of wireless communication apparatus 1000 as in the semiconductor integrated circuit 100 of the first embodiment.

Figure 6:
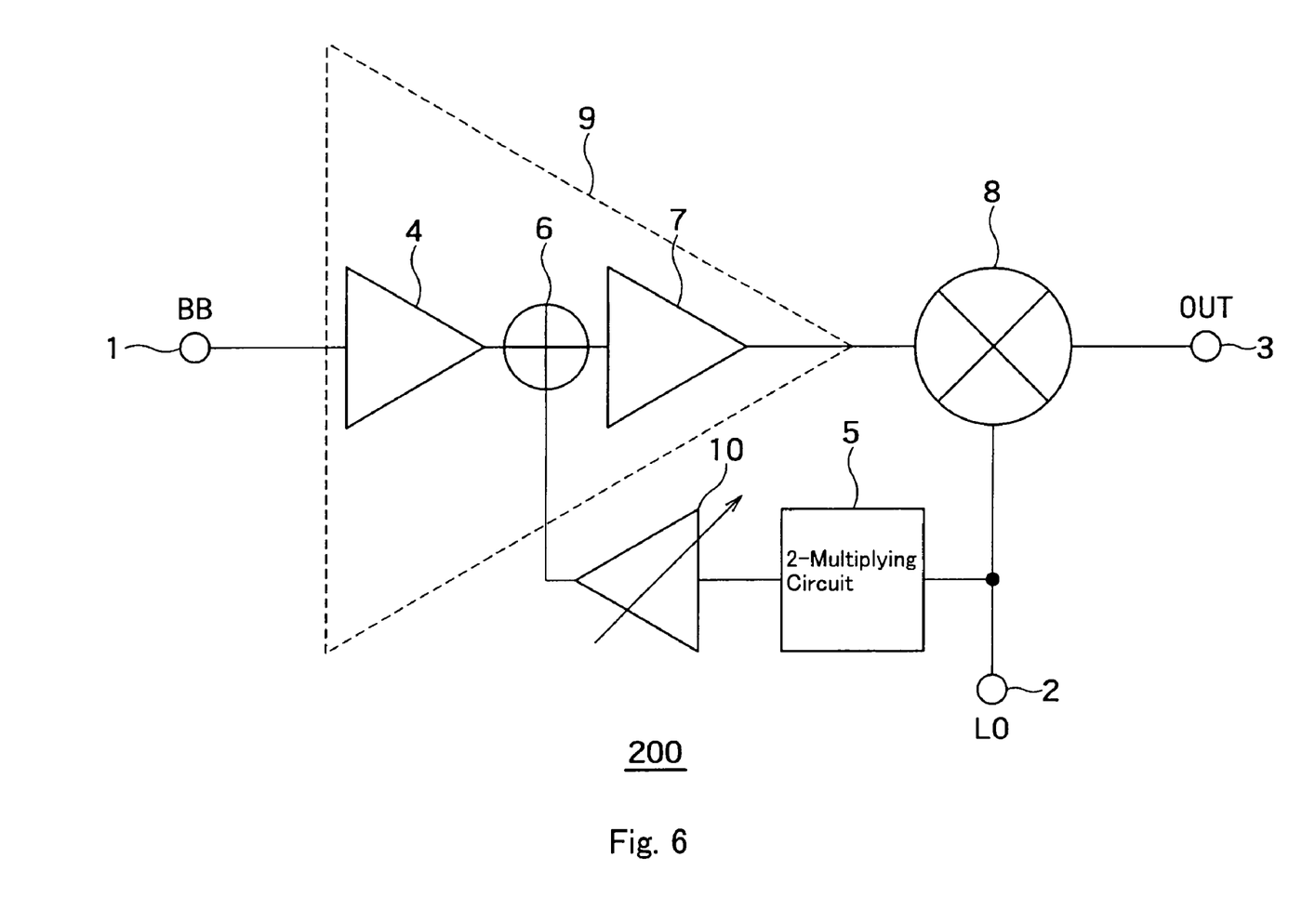
FIG. 6 is a block diagram of a semiconductor integrated circuit 200 of a second embodiment of the present invention.

FIG. 6 is the configuration of the semiconductor integrated circuit 200 of the second embodiment. In addition, in FIG. 6, the components to which the same reference indicators as in FIG. 5 are given show the same components as in the first embodiment.

As shown in FIG. 6, semiconductor integrated circuit 200 further includes a variable gain amplifier circuit 10, as compared with the semiconductor integrated circuit 100 of the first embodiment. In addition, other components of the semiconductor integrated circuit 200 are the same as those of the semiconductor integrated circuit 100 of the first embodiment.

As in the first embodiment, 1st amplifier circuit 4 receives a baseband signal (BB) through 1st input terminal 1, and outputs the amplified signal of the baseband signal (BB).

2-multiplying circuit 5 receives a local oscillation (LO) signal through 2nd input terminal 1, and outputs the 2-multiplied signal of the input local oscillation (LO) signal. In addition, in this second embodiment, the gain of 2-multiplying circuit 5 is set to 1.

Variable gain amplifier circuit 10 receives the multiplied signal from the 2-multiplying circuit 5, and outputs the amplified signal of this input multiplied signal. Gain A of variable gain amplifier circuit 10 is variable.

In addition, since the gain of 2-multiplying circuit 5 is set to 1, multiplied signal LO2(t) output of 2-multiplying circuit 5 is expressed with equation (5A) in this embodiment.

$$LO2(t) = -\cos(2\omega_0 t) \qquad (5A)$$

Moreover, adder 6 adds the output signal of 1st amplifier circuit 4 and the output signal of variable gain amplifier circuit 10, and outputs the acquired addition signal.

2nd amplifier circuit 7 receives the addition signal and outputs the amplified signal of the addition signal.

Mixer 8 multiplies the output signal of 2nd amplifier circuit 7 and the LO (local oscillation) signal input through 2nd input terminal 2 and outputs a modulating signal to output terminal 3.

As mentioned above, in the semiconductor integrated circuit 200 of the second embodiment, variable gain amplifier circuit 10 for adjusting the output level of 2-multiplying circuit 5 is arranged at the output of 2-multiplying circuit 5.

Here, output Out(t) of mixer 8 is expressed as in equation (6A). In addition, in equation (6A), A is the gain of 2-multiplying circuit 5 as in the first embodiment. Gain A is a real number. Moreover, equation (6A) is equivalent to equation (6). Therefore, equation (10) is expressed from equation (7) as in the first embodiment by assigning equations (1) through (4) and (5A) to equation (6A).

$$Out(t)=LO(t)\times Amp2(Amp1(BB(t))+A\times LO2(t)) \quad (6A)$$

In the first embodiment, when the value of gain A satisfies the conditions of frequency $(f_0-3f_{BB})$ component C2=0 as shown in equation (8), a spurious signal of frequency $(f_0-3f_{BB})$ is cancelled.

However, in equation (8), frequency $(f_0-3f_{BB})$ component C2 is a second function of Gain A. That is, it turns out that the spurious signal cancellation degree of frequency $(f_0-3f_{BB})$ changes with the values of Gain A.

Figure 7:
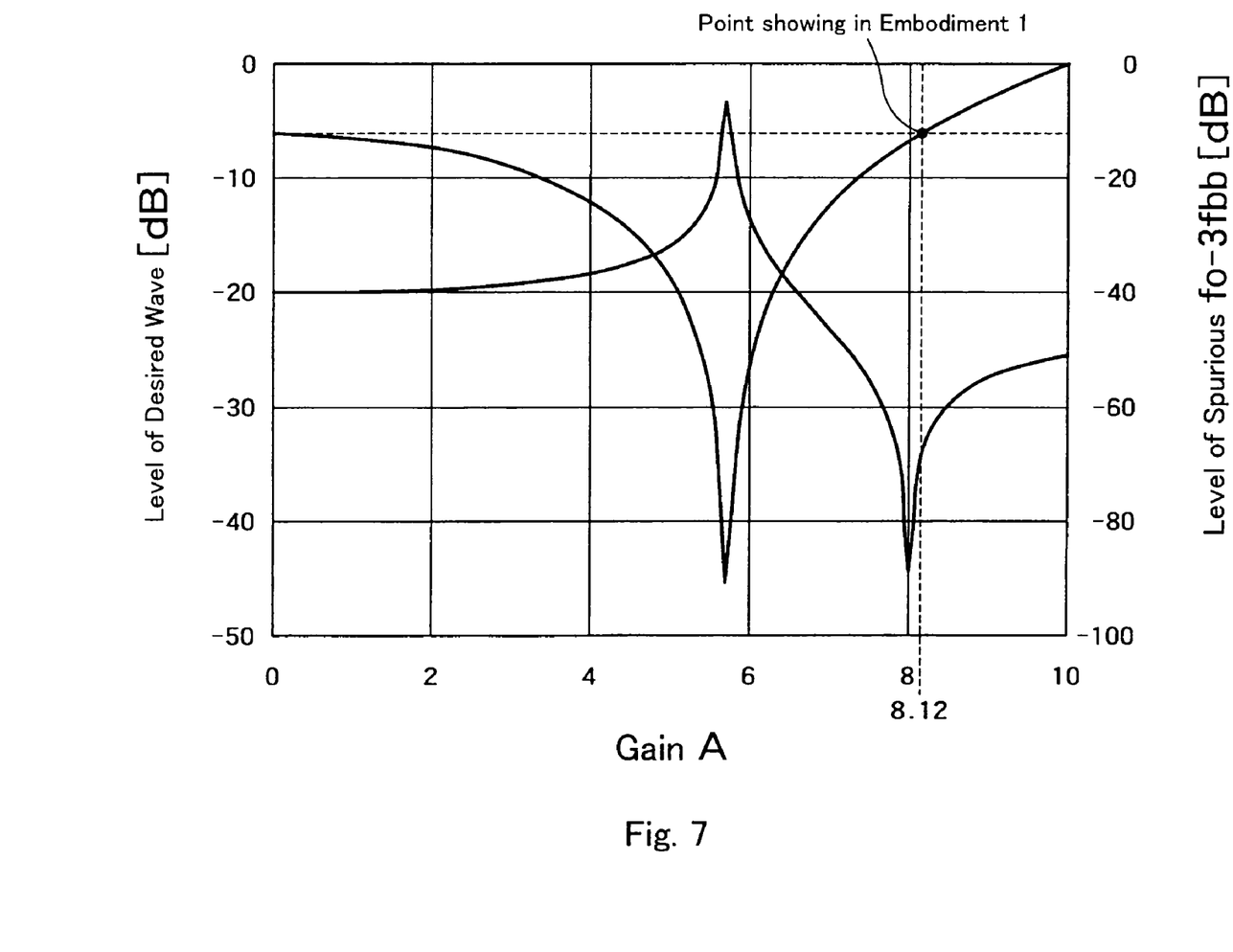
FIG. 7 is a chart shown the relation of gain A of variable gain amplifier circuit 10 and a level of desired wave, and gain A and the spurious signal level of frequency $f_O - 3f_{BB}$.

Then, for example, in the case of $\alpha_3=-0.02$ and $\beta_3=-0.02$, the relation of a desired wave and a spurious signal level of frequency $(f_0-3f_{BB})$ has been studied when changing gain A as shown in FIG. 7.

As shown in FIG. 7, it is possible to adjust the level of the desired wave and the spurious signal level of frequency $(f_0-3f_{BB})$ by adjusting the gain A of variable gain amplifier circuit 10.

Moreover, as in the first embodiment, since the semiconductor integrated circuit 200 does not include a SAW filter, circuit area can be reduced.

Thereby, the semiconductor integrated circuit of this second embodiment can reduce a spurious signal and reduce a circuit area.

Figure 8:
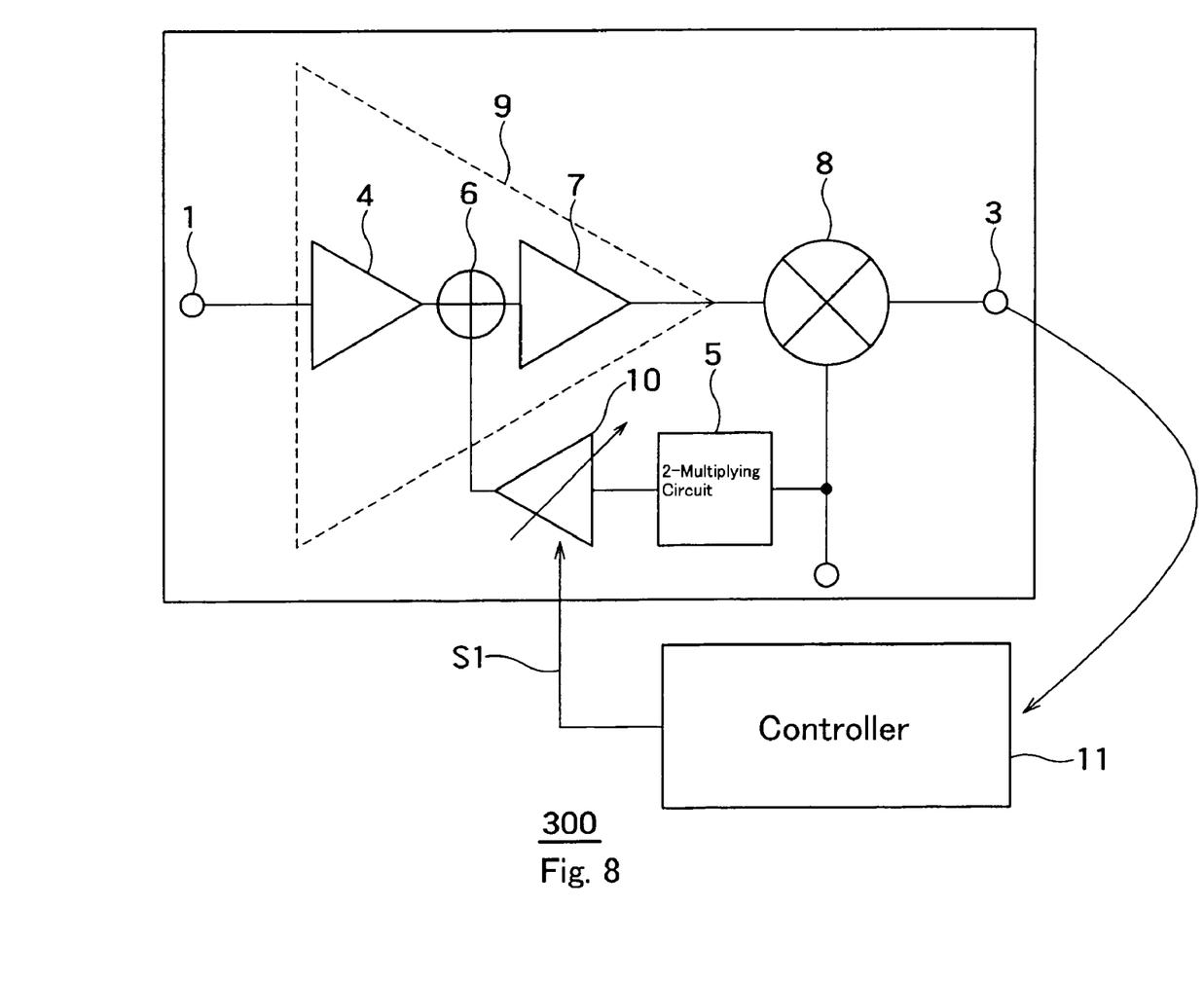
FIG. 8 a block diagram of a semiconductor integrated circuit 300 of a third embodiment of the present invention.

A third embodiment of the present invention as shown in FIG. 8 describes an example of a configuration for controlling a variable gain amplifier circuit. In addition, as shown in FIG. 8, a semiconductor integrated circuit 300 is applied to a wireless transmitter 1001 of a wireless communication apparatus 1000 as in the semiconductor integrated circuit 200 of the second embodiment.

FIG. 8 is the configuration of semiconductor the integrated circuit 300 of the third embodiment. In addition, in FIG. 8, the components to which the same signs as in FIG. 6 are given show the same components as of the second embodiment of FIG. 6.

As shown in FIG. 8, semiconductor integrated circuit 300 includes a controller circuit 11 as compared with the semiconductor integrated circuit 200 of the second embodiment. In addition, other components of the semiconductor integrated circuit 300 are the same as those of the semiconductor integrated circuit 200 of the second embodiment.

Controller circuit 11 detects the amplitude (level) of signal frequency $(f_0-3f_{BB})$ which is included in the modulating signal output from output terminal 3 and generated by 3rd distortion. Controller circuit 11 also controls the gain A of variable gain amplifier circuit 10 by control signal S1 according to amplitude (level).

Controller circuit 11 can realize a function that detects the modulating signal by using wireless receiver 1003 and being carried in the same chip as wireless transmitter 1001.

As mentioned above, semiconductor integrated circuit 300 can automatically adjust gain A of variable gain amplifier circuit 10 so that spurious signal level of frequency $f_0-3f_{BB}$ is detected and the level becomes lower by controller circuit 11.

Moreover, as in the second embodiment, since semiconductor integrated circuit 300 does not include a SAW filter, circuit area can be reduced.

Thereby, the semiconductor integrated circuit of this third embodiment can reduce a spurious signal and reduce circuit area.

In the configuration of the third embodiment, it is possible to adjust the spurious signal level of frequency $f_0-3f_{BB}$ by adjusting gain A. However, the level of a desired wave also changes by adjusting the value of gain A.

Figure 9:
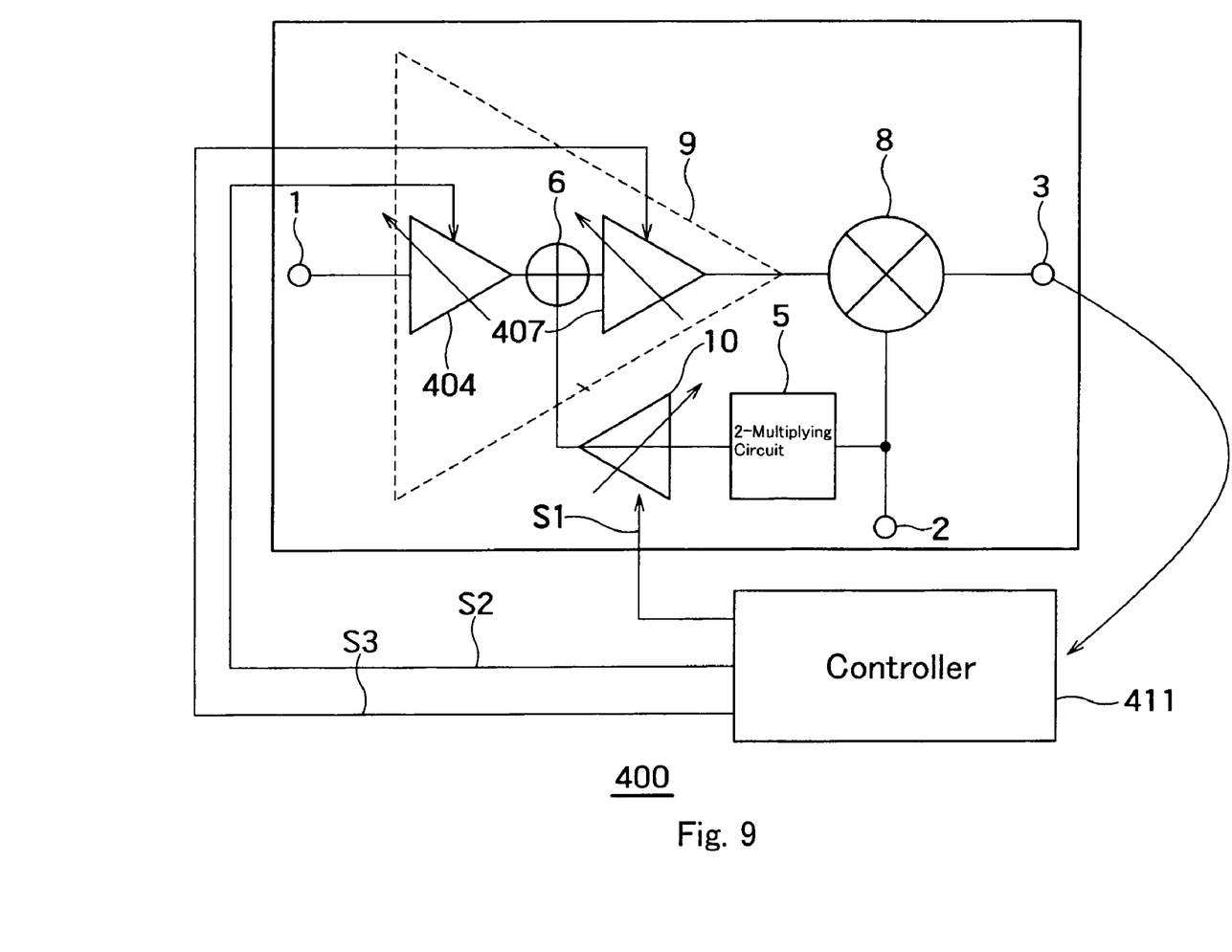
FIG. 9 is a block diagram of a semiconductor integrated circuit 400 of a fourth embodiment of the present invention.

So, in a fourth embodiment of the present invention shown in FIG. 9, a configuration for controlling change of a level of a desired wave is explained. In addition, semiconductor integrated circuit 400 is applied to wireless transmitter 1001 of wireless communication apparatus 1000 as in the semiconductor integrated circuit 300 of the third embodiment.

FIG. 9 is the configuration of a semiconductor integrated circuit 400 of the fourth embodiment. In addition, in FIG. 9, the components to which the same signs as in FIG. 6 are given show the same component as in the second embodiment of FIG. 6.

As shown in FIG. 9, in semiconductor integrated circuit 400, gains of 1st amplifier circuit 404 and 2nd amplifier circuit 407 are variable. This is different from the 1st amplifier circuit 4 and 2nd amplifier circuit 7 of the semiconductor integrated circuit 300 of the third embodiment.

Moreover, the semiconductor integrated circuit 400 includes a controller circuit 411.

Controller circuit 411 detects amplitude (level) of signal $f_0-3f_{BB}$ which is included in the modulating signal output from output terminal 3, as in the controller circuit 11 of the third embodiment, and that is generated by 3rd distortion. Controller circuit 411 also controls gain A of variable gain amplifier circuit 10 by control signal S1 according to amplitude (level).

Furthermore, controller circuit 411 detects the amplitude of a desired wave $(f_0+f_{BB})$ included in a modulating signal, and controls the gain of 1st amplifier circuit 404 and the gain of 2nd amplifier circuit 407 by control signals S2 and S3 according to that amplitude.

Controller circuit 411 can realize a function that detects this modulating signal by using wireless receiver 1003 and being carried in the same chip as wireless transmitter 1001.

In addition, other components of the semiconductor integrated circuit 400 are the same as those of the semiconductor integrated circuit 300 of the third embodiment.

As mentioned above, semiconductor integrated circuit 400 can automatically adjust gain A of variable gain amplifier circuit 10 so that the spurious signal level of frequency $f_0-3f_{BB}$ is detected and the level becomes lower by controller circuit 411 as in the third embodiment.

Furthermore, in semiconductor integrated circuit 400, the level of a desired wave is also detected by controller circuit 411, and control signals S2 and S3 are fed back to 1st amplifier circuit 404 and 2nd amplifier circuit 407 according to a signal level of the desired wave.

Spurious signal level of frequency $f_0-3f_{BB}$ also changes when the gain of 1st amplifier circuit 404 and 2nd amplifier circuit 407 changes. However, it is configurable to set the spurious signal level of $f_0-3f_{BB}$ to an optimum value according to the feed back mechanism shown in the fourth embodiment.

That is, in the semiconductor integrated circuit 400 of the fourth embodiment, it is automatically possible to adjust a request wave level and the spurious signal level of frequency $f_0-3f_{BB}$ to optimum values simultaneously.

Moreover, as in the third embodiment, since the semiconductor integrated circuit 400 does not include a SAW filter, circuit area can be reduced.

Thereby, the semiconductor integrated circuit of this fourth embodiment can reduce a spurious signal and reduce a circuit area.

In addition, although the fourth embodiment has a configuration for controlling both gains of 1st amplifier circuit 404 and 2nd amplifier circuit 407, it is also possible to control only either of these gains in the fourth embodiment.

Obviously, numerous additional modifications and variations of the present invention are possible in light of the above teachings. It is therefore to be understood that within the scope of the appended claims, the invention may be practiced otherwise than as specifically described herein.

What is claimed is:

1. A semiconductor integrated circuit comprising:
a first input terminal configured to input a baseband signal;
a second input terminal configured to input a local oscillation signal;
an output terminal configured to output a modulating signal;
a first amplifier circuit configured to receive the baseband signal through the first input terminal and to output a first amplified signal of the baseband signal;
a 2-multiplying circuit configured to receive the local oscillation signal through the second input terminal and to output a 2-multiplied signal of the local oscillation signal;
an adder configured to add the 2-multiplied signal and the first amplified signal and to output an addition signal;
a second amplifier circuit configured to receive the addition signal and to output a second amplified signal of the addition signal; and
a mixer configured to multiply the second amplified signal and the local oscillation signal, and to output the modulating signal to the output terminal.

2. The semiconductor integrated circuit according to claim 1, further comprising:
a variable gain amplifier circuit configured to receive the 2-multiplied signal, having a variable gain, and to output an amplified signal of the 2-multiplied signal according to the variable gain,
wherein the adder is configured to add the first amplified signal and the amplified signal of the 2-multiplied signal, and to output a resulting addition signal.

3. The semiconductor integrated circuit according to claim 2, further comprising:
a control circuit configured to detect a first amplitude of a signal included in the modulating signal and generated by a third distortion, and to control the variable gain of the variable gain amplifier circuit according to the first amplitude.

4. The semiconductor integrated circuit according to claim 3,
wherein the control circuit is further configured to detect a second amplitude of a desired wave included in the modulating signal, and to control a first gain of the first amplifier circuit and a second gain of the second amplifier circuit according to the second amplitude.

5. The semiconductor integrated circuit according to claim 4,
wherein the control circuit is further configured to output a second control signal to the first amplifier circuit and a third control signal to the second amplifier circuit.

6. The semiconductor integrated circuit according to claim 3,
wherein the control circuit is further configured to detect a second amplitude of a desired wave included in the modulating signal, and to control a first gain of the first amplifier circuit according to the second amplitude.

7. The semiconductor integrated circuit according to claim 6,
wherein the control circuit is further configured to output a second control signal to the first amplifier circuit.

8. The semiconductor integrated circuit according to claim 3,
wherein the control circuit is further configured to detect a second amplitude of a desired wave included in the modulating signal, and to control a second gain of the second amplifier according to the second amplitude.

9. The semiconductor integrated circuit according to claim 8,
wherein the control circuit is further configured to output a third control signal to the second amplifier circuit.

10. The semiconductor integrated circuit according to claim 3,
wherein the control circuit is further configured to output a first control signal to the variable gain amplifier circuit.

11. A wireless communication apparatus comprising:
a wireless transmitter including a wireless transmitting antenna;
a wireless receiver including a wireless receiving antenna;
wherein the wireless transmitter includes:
a first input terminal configured to input a baseband signal;
a second input terminal configured to input a local oscillation signal;
an output terminal configured to output a modulating signal;
a first amplifier circuit configured to receive the baseband signal through the first input terminal and to output a first amplified signal of the baseband signal;
a 2-multiplying circuit configured to receive the local oscillation signal through the second input terminal and to output a 2-multiplied signal of the local oscillation signal;
an adder configured to add the 2-multiplied signal and the first amplified signal and to output an addition signal;
a second amplifier circuit configured to receive the addition signal and to output a second amplified signal of the addition signal; and
a mixer configured to multiply the second amplified signal and the local oscillation signal, and to output the modulating signal to the output terminal.

12. The wireless communication apparatus according to claim 11, further comprising:
a variable gain amplifier circuit configured to receive the 2-multiplied signal, having a variable gain, and to output an amplified signal of the 2-multiplied signal according to the variable gain, wherein the adder is configured to add the first amplified signal and the amplified signal of the 2-multiplied signal, and to output a resulting addition signal.

13. The wireless communication apparatus according to claim 12, further comprising:

a control circuit configured to detect a first amplitude of a signal included in the modulating signal and generated by a third distortion, and to control the variable gain according to the first amplitude.

14. The wireless communication apparatus according to claim 13, wherein the control circuit is further configured to detect a second amplitude of a desired wave included in the modulating signal, and to control a first gain of the first amplifier circuit and a second gain of the second amplifier according to the second amplitude.

15. The wireless communication apparatus according to claim 14, wherein the control circuit is further configured to output a second control signal to the first amplifier circuit and a third control signal to the second amplifier circuit.

16. The wireless communication apparatus according to claim 13, wherein the control circuit is further configured to detect a second amplitude of a desired wave which is included in the modulating signal, and to control a first gain of the first amplifier circuit according to the second amplitude.

17. The wireless communication apparatus according to claim 16, wherein the control circuit is further configured to output a second control signal to the first amplifier circuit.

18. The wireless communication apparatus according to claim 13, wherein the control circuit is further configured to detect a second amplitude of a desired wave which is included in the modulating signal, and to control a second gain of the second amplifier according to the second amplitude.

19. The wireless communication apparatus according to claim 18, wherein the control circuit is further configured to output a third control signal to the second amplifier circuit.

20. The wireless communication apparatus according to claim 13, wherein the control circuit is further configured to output a first control signal to the variable gain amplifier circuit.

* * * * *